(12) United States Patent
Guo et al.

(10) Patent No.: US 10,474,145 B2
(45) Date of Patent: Nov. 12, 2019

(54) SYSTEM AND METHOD OF DEPTH SENSOR ACTIVATION

(71) Applicant: QUALCOMM Incorporated, San Diego, CA (US)

(72) Inventors: Feng Guo, San Diego, CA (US); Yingyong Qi, San Diego, CA (US); Ning Bi, San Diego, CA (US); Bolan Jiang, San Diego, CA (US); Chienchung Chang, Rancho Santa Fe, CA (US)

(73) Assignee: QUALCOMM Incorporated, San Diego, CA (US)

( * ) Notice: Subject to any disclaimer, the term of this patent is extended or adjusted under 35 U.S.C. 154(b) by 151 days.

(21) Appl. No.: 15/346,000

(22) Filed: Nov. 8, 2016

(65) Prior Publication Data

US 2018/0129202 A1 May 10, 2018

(51) Int. Cl.
| | | |
|---|---|---|
| *G05D 1/00* | (2006.01) | |
| *B60Q 9/00* | (2006.01) | |
| *B60W 10/06* | (2006.01) | |
| *B60W 30/18* | (2012.01) | |
| *B60W 40/08* | (2012.01) | |
| *G06K 9/00* | (2006.01) | |
| *B60W 30/182* | (2012.01) | |

(52) U.S. Cl.
CPC .......... *G05D 1/0061* (2013.01); *B60Q 9/00* (2013.01); *B60W 10/06* (2013.01); *B60W 30/182* (2013.01); *B60W 40/08* (2013.01); *G05D 1/0088* (2013.01); *G06K 9/00845* (2013.01); *B60W 2040/0818* (2013.01); *B60W 2540/26* (2013.01); *B60W 2710/06* (2013.01); *B60W 2900/00* (2013.01)

(58) Field of Classification Search
CPC .. B60L 11/1861; B60L 11/1842; B60L 11/12; B60L 11/184; B60L 2270/10; B60L 2250/16; G01C 21/3469; B60K 6/48
See application file for complete search history.

(56) References Cited

U.S. PATENT DOCUMENTS

| | | |
|---|---|---|
| 6,822,573 B2 | 11/2004 | Basir et al. |
| 7,460,940 B2 | 12/2008 | Larsson et al. |
| 8,725,311 B1 | 5/2014 | Breed |
| 9,292,471 B2 | 3/2016 | Fung et al. |

(Continued)

OTHER PUBLICATIONS

Craye C., "A Framework for Context-Aware Driver Status Assessment Systems", Jul. 23, 2013, XP055424879, Retrieved from the Internet: URL:https://uwspace.uwaterloo.ca/bitstream/handle/10012/7734/Craye_Celine.pdf?sequence=1&isAllowed=y [retrieved on Nov. 14, 2017], 140 pages.
International Search Report and Written Opinion—PCT/US2017/049882—ISA/EPO—dated Nov. 24, 2017.

(Continued)

*Primary Examiner* — Rodney A Butler
(74) *Attorney, Agent, or Firm* — QUALCOMM Incorporated

(57) ABSTRACT

An apparatus includes a first sensor configured to generate first sensor data. The first sensor data is related to an occupant of a vehicle. The apparatus further includes a depth sensor and a processor. The depth sensor is configured to generate data corresponding to a volume associated with at least a portion of the occupant. The processor is configured to receive the first sensor data and to activate the depth sensor based on the first sensor data.

30 Claims, 5 Drawing Sheets

(56) References Cited

U.S. PATENT DOCUMENTS

| | | | |
|---|---|---|---|
| 9,298,994 | B2 | 3/2016 | Marti et al. |
| 2004/0220705 | A1* | 11/2004 | Basir ............... B60N 2/002 701/1 |
| 2013/0148845 | A1* | 6/2013 | Maeda ............... G01S 17/023 382/103 |
| 2013/0204457 | A1 | 8/2013 | King et al. |
| 2013/0258099 | A1* | 10/2013 | Ovsiannikov ....... G01B 11/026 348/140 |
| 2016/0046261 | A1* | 2/2016 | Gulash ............... B60R 22/48 701/23 |
| 2016/0272217 | A1 | 9/2016 | Kim et al. |
| 2016/0295192 | A1* | 10/2016 | Hsu ............... B66B 1/2408 |
| 2017/0067750 | A1* | 3/2017 | Day ............... G01C 21/3461 |
| 2018/0009442 | A1* | 1/2018 | Spasojevic ....... G08G 1/096833 |
| 2018/0012085 | A1* | 1/2018 | Blayvas ............ G06K 9/00805 |

OTHER PUBLICATIONS

Kinect For Windows Team: "Inside the Newest Kinect for Windows SDK-Infrared Control", Kinect for Windows Product Blog, Dec. 7, 2012, XP055425472, Retrieved from the Internet: URL:https://blogs.msdn.microsoft.com/kinectforwindows/2012/12/07 /inside-the-newest-kinect-for-windows-sdkinfrared-control/ [retrieved on Nov. 15, 2017], 2 pages.

Li L., "A Multi-Sensor Intelligent Assistance System for Driver Status Monitoring and Intention Prediction Ein multisensorisches intelligentes Assistenzsystem fur die Uberwachung des Fahrerzustands und die Vorhersage der Fahrerhandlungsabsicht", Jun. 6, 2016, XP055424717, Retrieved from the Internet: URL:https://kluedo.ub.uni-kl.de/frontdoor/deliver/index/docId/4549/file/_Li_Li_PhD_Thesis_Finai_ISE.pdf [retrieved on Nov. 14, 2017], 174 pages.

Molchanov P., et al., "Multi-Sensor System for Driver's Hand-Gesture Recognition", 2015 11th IEEE International Conference and Workshops on Automatic Face and Gesture Recognition (FG), May 1, 2015, pp. 1-8, XP055286586, DOI: 10.1109/FG.2015.7163132, ISBN: 978-1-4799-6026-2.

* cited by examiner

SYSTEM AND METHOD OF DEPTH SENSOR ACTIVATION

I. FIELD

The present disclosure is generally related to depth sensor activation.

II. DESCRIPTION OF RELATED ART

Driver assistance systems are included in automobiles to monitor driver alertness. For example, a driver assistance system may include a sensor, such as a camera, that generates sensor data (e.g., two dimensional image data) of a driver. The driver assistance system may process the sensor data and monitor the two dimensional input to determine a state of the driver. For example, a processor of the driver assistance system may determine a head pose (corresponding to an orientation of the driver's head) of the driver and determine whether the driver is distracted based on the head pose. In an illustrative example, the processor may determine that the driver is distracted or not looking at the road when the driver's head is slumped over (e.g., indicating the driver is asleep or otherwise incapacitated). In response to determining that the driver is in a compromised or hazardous state, the driver assistance system may initiate a remedial action (e.g., activating an alert, automatically engaging an autopilot, etc.).

In some implementations, accurately determining a state of the driver may be difficult. For example, determining an accurate head pose based on two dimensional data may be difficult because a human head may move in three dimensions. Accordingly, the driver assistance system may include a depth sensor, such as a laser depth sensor, to gather depth data. The processor may combine the depth data with the two dimensional data to determine three dimensional data and may use the three dimensional data to more accurately determine the head pose. However, long term exposure to a laser may be undesirable. For example, long term constant or frequent exposure of a human eye to a laser may result in damage to a human eye.

III. SUMMARY

In a particular example, an apparatus is disclosed that includes a first sensor configured to generate first sensor data. The sensor data is related to an occupant of a vehicle. The apparatus further includes a depth sensor and a processor. The depth sensor is configured to generate data corresponding to a volume associated with at least a portion of the occupant. The processor is configured to receive the first sensor data and to determine whether to activate the depth sensor based on the first sensor data.

In another particular example, a method of activating a sensor includes receiving, at a processor, first sensor data from a first sensor. The first sensor data is related to an occupant of a vehicle. The method further includes sending an activation signal from the processor to a depth sensor based on the first sensor data. The method further includes receiving, at the processor, depth data from the depth sensor. The depth data corresponds to a volume associated with at least a portion of the occupant.

In another particular example, an apparatus includes means for generating first sensor data related to an occupant of a vehicle. The apparatus further includes means for generating depth data corresponding to a volume associated with at least a portion of the occupant. The apparatus further includes means for activating the means for generating depth data based on the first sensor data.

In another particular example, a computer readable storage medium stores instructions that, when executed by a processor, cause the processor to receive first sensor data from a first sensor. The first sensor data is related to an occupant of a vehicle. The instructions, when executed by the processor, further cause the processor to activate a depth sensor based on the first sensor data. The instructions, when executed by the processor, further cause the processor to receive depth data from the depth sensor. The depth data corresponds to a volume associated with at least a portion of the occupant.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
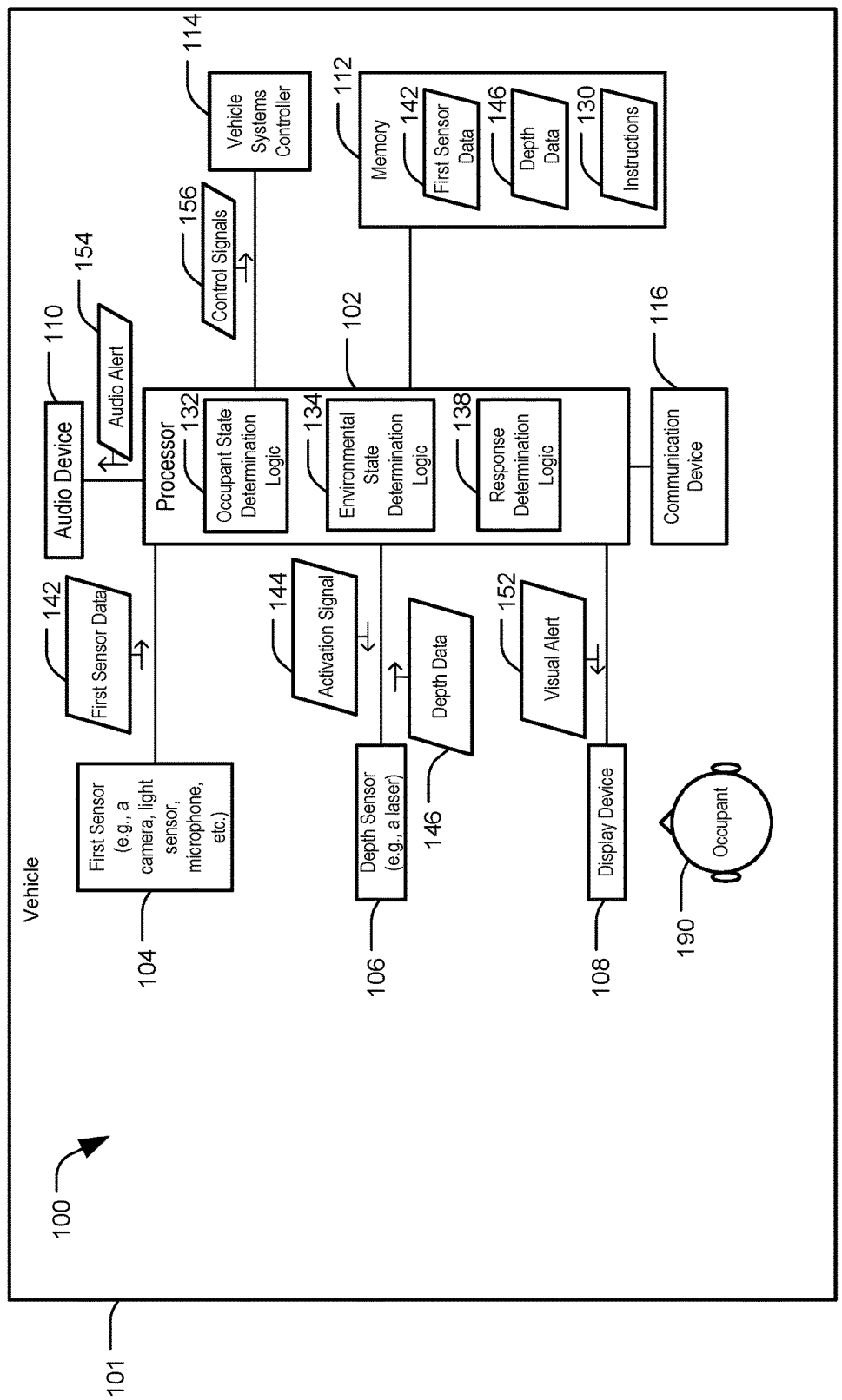
FIG. 1 is a block diagram of a particular illustrative example of a system for activating a sensor.

Particular implementations of the present disclosure are described below with reference to the drawings. In the description, common features are designated by common reference numbers throughout the drawings. As used herein, various terminology is for the purpose of describing particular implementations only and is not intended to be limiting of implementations. For example, the singular forms "a," "an," and "the" are intended to include the plural forms as well, unless the context clearly indicates otherwise. It may be further understood that the terms "comprises" and "comprising" may be used interchangeably with "includes" or "including." Additionally, it will be understood that the term "wherein" may be used interchangeably with "where." As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

According to the present disclosure, a system, such as a driver assistance system or other control system, selectively activates a depth sensor to detect a state of an occupant of a vehicle. The system may include a first sensor and the depth sensor. In some implementations, the first sensor includes a camera and the depth sensor includes a laser device. The depth sensor may be activated based on data corresponding to the first sensor. To illustrate, the depth sensor may be activated in response to a determination that the data indicates that the state associated with the occupant corresponds to a particular state (e.g., at least one) of one or more defined states, such as a dangerous or hazardous state.

Each of the one or more defined states may be associated with corresponding parameters that are stored in memory. The parameters may be indicative of a behavior or condition of the occupant. For example, the one or more defined states may be associated with the occupant being asleep, distraction of the occupant, impairment of the occupant, a medical emergency of the occupant, or a combination thereof. Additionally or alternatively, the depth sensor may be activated in response to a determination that the data indicates that the state associated with the occupant does not correspond to any of the one or more defined states. To illustrate, the one or more defined states may include an alert state, a focused state, a healthy state, or a combination thereof. Additionally or alternatively, the depth sensor may be activated in response to a determination that the data indicates a particular environmental state (e.g., an interior of the vehicle is dark).

After being activated, the depth sensor may generate depth data. The depth data may be used to determine (e.g., to confirm) the state of the occupant. In some implementations, the depth sensor may be deactivated after the state of the occupant is determined. Since the depth sensor is selectively activated, the occupant may be exposed to the laser for a shorter period of time as compared to systems in which the depth sensor is constantly activated. Accordingly, the system may present fewer adverse effects associated with user of a laser. For example, the system may reduce health risks (e.g., eye damage) associated with frequent exposure to a laser.

Referring to FIG. 1, a particular illustrative example of a system 100 for activating a sensor is shown. The system 100 is shown within a vehicle 101. In particular examples, the system 100 is integrated into the vehicle 101. In other examples, the system 100 or components thereof may be incorporated into or associated with a device, such as a mobile communication device or other device (e.g., a head mounted display or another body mounted device), that is located within the vehicle 101. In some implementations, portions of the system 100 may be distributed within the vehicle 101, and other portions of the system 100 may be distributed outside of the vehicle 101. To illustrate, a first portion of the system 100 within the vehicle 101 may communicate with a second portion of the system 100 located outside the vehicle 101. The first portion may be included in a mobile device or integrated into the vehicle 101. The second portion may be included in one or more servers or other devices located outside of or remote to the vehicle 101. The first portion may communicate with the second portion using a wireless connection via one or more wireless access networks.

In alternative examples, the system 100 may be incorporated into or used in conjunction with a device other than a vehicle. To illustrate, the system 100 may be incorporated into manufacturing equipment or other equipment designed to operate with human interaction. For example, the system 100 may be integrated into a remote vehicle control station, a machine press safety system, or a video game console human machine interface.

The vehicle 101 (e.g., a device) may include an automobile or other type of vehicle (e.g., another type of land vehicle, a watercraft, an aircraft, a spacecraft, etc.). The vehicle 101 is illustrated as having an occupant 190. The occupant 190 may correspond to an operator of the vehicle 101 or a passenger in the vehicle 101. In a particular implementation, the occupant 190 may not control the vehicle at all times. For example, the vehicle 101 may include a self-operation function (e.g., a self-driving function). In such implementations, the occupant 190 may operate the vehicle 101 in response to a prompt (e.g., in case of an emergency), or the occupant 190 may initiate operation of the vehicle 101. In some implementations, the occupant 190 is not located inside of the vehicle 101. To illustrate, the vehicle 101 may correspond to a remote-operated vehicle, such as an unmanned ground vehicle, an unmanned aerial vehicle, an unmanned underwater vehicle, or an unmanned surface vehicle. In some implementations, the occupant 190 may correspond to a passenger of the vehicle 101 and may not operate the vehicle 101. In particular implementations, the vehicle 101 is a fully automated vehicle and actions of the vehicle 101 may be automatically performed based on a state of a passenger of the vehicle 101, such as the occupant 190. For example, the vehicle 101 may be an automated vehicle and may generate an alert (e.g., a haptic alert, a visual alert, an audio alert, or a combination thereof) in response to determining that the occupant 190 is asleep as the vehicle 101 approaches a destination of the vehicle 101.

The system 100 includes a first sensor 104, a depth sensor 106, a display device 108, an audio device 110, a processor 102, a communication device 116, a vehicle systems controller 114, and a memory 112. The first sensor 104 may include an image sensor (e.g., a camera), a light level (e.g., light intensity) sensor, an audio sensor (e.g., a microphone), a temperature sensor, another type of sensor, or a combination thereof. To illustrate, the first sensor 104 may correspond to a sensor array that includes more than one sensor or may correspond to a single sensor. The depth sensor 106 may correspond to a laser depth sensor device (e.g., a depth sensor that includes a laser device) or a three dimensional camera, as illustrative, non-limiting examples. The depth sensor 106 is configured to generate depth data corresponding to a volume, such as a space (e.g., a three-dimensional space), associated with at least a portion of the occupant 190. For example, the depth sensor 106 may be targeted to a seat of the occupant 190. Thus, the depth sensor 106 is able to sense a distance to the occupant 190 when the occupant 190 is in the seat. Additionally or alternatively, the depth sensor 106 generates three dimensional data associated with at least a portion of the occupant 190, such as three dimensional data corresponding to facial features of the occupant 190. The volume may be located within the vehicle 101.

The display device 108 and the audio device 110 may correspond to output devices. For example, the display device 108 may include a display screen, such as a touch screen device or other type of display. The audio device 110 may include one or more speaker units.

The processor 102 may include a central processor unit (CPU) or other type of processor. The processor 102 is in communication with the first sensor 104, the depth sensor 106, the display device 108, the audio device 110, the communication device 116, the vehicle systems controller 114, and the memory 112 (e.g., components). While illustrated as being in direct communication with the components 104, 106, 108, 110, 112, 114, 116, the processor 102 may communicate with the components 104, 106, 108, 110, 112, 114, 116 via one or more buses, one or more wireless communications connections, one or more wired connections, one or more other connections, or a combination thereof. Particular implementations of the system 100 may include more or fewer components.

The processor 102 includes occupant state determination logic 132, environmental state determination logic 134, and response determination logic 138. One or more of the occupant state determination logic 132, the environmental state determination logic 134, and the response determination logic 138 may correspond to special purpose circuitry of the processor 102, to general purpose circuitry of the processor 102 executing instructions 130, or to a combination thereof.

The communication device 116 may include a wireless communication system, such as a WI-FI® interface (WI-FI is a registered trademark of Wi-Fi Alliance Corporation California of Austin, Tex.), a long term evolution (LTE®) interface (LTE is a registered trademark of Institut Européen des Normes; de Télécommunication Association of France), another type of communication interface, or a combination thereof.

The vehicle systems controller 114 may include one or more processors, actuators, etc., that control operation of the vehicle 101. For example, the vehicle systems controller 114 may include one or more components that control a braking system of the vehicle 101, a steering system of the vehicle 101, an acceleration system of the vehicle 101, a haptic feedback system of the vehicle 101, an audio/visual system (e.g., an entertainment system) of the vehicle 101, another system of the vehicle 101, or a combination thereof.

The memory 112 may correspond to a computer-readable storage device (e.g., a non-transitory computer-readable storage medium). Although illustrated as a single memory, the memory 112 may include one or more memory devices. For example, the memory 112 may include a volatile memory device, such as a random access memory device. Additionally or alternatively, the memory 112 may include a non-volatile memory device, such as a solid state drive device. In the illustrated example, the memory 112 stores the instructions 130. The instructions 130 may be executable by the processor 102 to perform one or more operations.

In operation, the processor 102 may activate the first sensor 104 but not the depth sensor 106. For example, the processor 102 may activate the first sensor 104 in response to activation of the system 100. The processor 102 may receive first sensor data 142 from the first sensor 104. To illustrate, the first sensor data 142 may include two dimensional image data, audio data, light level data, or a combination thereof. The first sensor data 142 may be associated with at least a portion of the occupant 190. For example, the first sensor data 142 may include image data representing an image of the occupant 190, audio data representing sounds made by the occupant 190, or data describing an environment (e.g., an area) associated with at least a portion of the occupant 190. In some examples, the processor 102 may cause the first sensor data 142 to be stored in the memory 112.

Based on the first sensor data 142, the processor 102 may determine to activate the depth sensor 106. For example, the occupant state determination logic 132 may determine to activate the depth sensor 106 in response to determining that the first sensor data 142 indicates that a state of the occupant 190 matches a particular state (e.g., at least one state) of one or more defined states (e.g., a first set of states). Alternatively, the occupant state determination logic 132 may activate the depth sensor 106 in response to determining that the first sensor data 142 indicates that the state of the occupant 190 does not match a particular state (e.g., at least one state) of one or more defined states (e.g., a second set of states). The first set of states may include states that are associated with hazardous operation of the vehicle 101, such as a distracted state, a sleeping while driving state, an impaired state, or a combination thereof. In addition or in the alternative, the first set of states may include a medical emergency state, a sleeping state (e.g., within a particular time period of arriving at a destination, such as a bus stop), or a combination thereof. The second set of states may include an alert state, a focused state, a healthy state, or a combination thereof.

The occupant state determination logic 132 may identify a state of the occupant 190 by comparing the first sensor data 142 to patterns or models corresponding to or representative of states, as described further herein. In some examples, the occupant state determination logic 132 may identify the state of the occupant 190 based on the first sensor data 142 indicating (e.g., matching patterns or models) the state for a threshold period of time.

Further, the environmental state determination logic 134 may determine to activate the depth sensor 106 based on a state of an environment associated with at least a portion of the occupant 190 (e.g., the volume associated with at least a portion of the occupant 190 or an interior volume of a vehicle). To illustrate, if a light level of the volume is low, distinguishing the occupant 190 based on image data may be difficult. To further illustrate, if noise level in the volume is high, distinguishing sounds generated by the occupant 190 from audio data of the volume may be difficult. Accordingly, the environmental state determination logic 134 may determine to activate the depth sensor 106 in response to determining that the first sensor data 142 indicates that the state of the volume corresponds to one or more environmental states that inhibit detection of the state of the occupant 190. The environmental state determination logic 134 may determine to activate the depth sensor 106 in response to determining that the first sensor data 142 indicates the one or more environmental states for a threshold period of time. The plurality of environmental states may include a poor lighting state, a noisy state, or a bright state.

In response to determining to activate the depth sensor 106, the processor 102 may send an activation signal 144 to the depth sensor 106. In some examples, the processor 102 may activate the depth sensor 106 in response to detecting that a state of the occupant 190 corresponds to one or more defined states or that a state of the environment corresponds to a particular environmental state of one or more environmental states for a duration of time that satisfies a third threshold. Activating the depth sensor 106 may enable the processor 102 to confirm (verify) that the occupant 190 is in a state that corresponds to the one or more defined states.

In an illustrative example of activating the depth sensor 106, the first sensor data 142 may include image data (e.g., two dimensional data) representing an image of the occupant 190. The occupant state determination logic 132 may identify characteristics, such as an estimated head pose of the occupant 190, features of a face of the occupant 190 (e.g., a gaze direction of the occupant 190, whether the eyes of the occupant 190 are open, etc.) or a combination thereof based on the first sensor data 142. Based on the characteristics, the occupant state determination logic 132 may identify the state of the driver. For example, the head pose or the gaze direction may indicate that the occupant 190 is looking away from a road on which the vehicle 101 is traveling and that the state of the occupant 190 corresponds to one or more defined states (e.g., the distracted state). In another example, the head pose or the gaze direction may indicate that the occupant 190 is asleep. Accordingly, as the vehicle 101 approaches a destination (e.g., a bus stop), the occupant state determination logic 132 may determine may identify the state of the occupant 190 corresponds to one or more defined states (e.g., the "about to miss destination" state). In response to the occupant state determination logic 132 detecting that the state of the occupant 190 corresponds to the one or more defined states (e.g., a dangerous state, such as a distracted state), the occupant state determination logic 132 may send the activation signal 144 to the depth sensor 106. In some implementations, the occupant state determination logic 132 may track the head pose of the occupant 190 or the features of the face of the occupant 190 over time and may generate the activation signal 144 in response to determining that the state of the occupant 190 corresponds to the one or more defined states for a period of time that satisfies a time threshold. Alternatively, the occupant state determination logic 132 may generate the activation signal 144 in response to determining that the state of the occupant 190 does not match any of one or more defined states (e.g., an alert state) for a period of time that satisfies the time threshold.

As another illustrative example of activating the depth sensor 106, the occupant state determination logic 132 may determine a probability that the occupant 190 is breathing, a change in a rate of breathing, or a combination thereof, based on audio data included in the first sensor data 142. To illustrate, the occupant state determination logic 132 may perform one or more audio recognition algorithms to identify the probability. In response to the probability that the occupant 190 is breathing satisfying a threshold (e.g., the probability being less than or equal to the threshold), the occupant state determination logic 132 may determine the state of the occupant 190 corresponds to a particular state (e.g., an incapacitated state) of one or more defined states. In response to the occupant state determination logic 132 detecting that the state of the occupant 190 corresponds to one or more defined states, the occupant state determination logic 132 may send the activation signal 144 to the depth sensor 106.

As another illustrative example of activating the depth sensor 106, the occupant state determination logic 132 may use one or more audio source detection techniques to determine a location or an orientation of the occupant 190 based on the audio data included in the first sensor data 142. For example, the first sensor data 142 may include audio data from a plurality of microphones. The occupant state determination logic 132 may identify (e.g., using an approximation or triangulation technique) the location based on relative strengths or receipt times of signals recorded at each of the plurality of microphones. The occupant state determination logic 132 may classify the state of the occupant 190 based on the location or the orientation. For example, based on the audio data, the occupant state determination logic 132 may determine that the occupant 190 is not positioned behind a steering wheel of the vehicle 101. Accordingly, the occupant state determination logic 132 may determine that the state of the occupant 190 corresponds to a particular state (e.g., a distracted state) of one or more defined states. In response to the occupant state determination logic 132 detecting that the state of the occupant 190 corresponds to the one or more defined states, the occupant state determination logic 132 may send an activation signal 144 to the depth sensor 106. In alternative examples, the occupant state determination logic 132 may send the activation signal 144 to the depth sensor 106 in response to determining that the state of the occupant 190 does not correspond to any of one or more defined states (e.g., an alert state, an awake state, etc.).

As another illustrative example of activating the depth sensor 106, the environmental state determination logic 134 may determine whether to activate the depth sensor 106 based on light level data (e.g., indicating brightness or intensity) included in the first sensor data 142. The light level data may indicate a brightness of the volume. The environmental state determination logic 134 may compare the light level data to a light level threshold. When the brightness is less than the light level threshold, the occupant 190 may be difficult to distinguish in images included in the first sensor data 142. In response to the light level data satisfying the light level threshold (e.g., the light level data indicating a light level below the light level threshold), the environmental state determination logic 134 may send the activation signal 144 to the depth sensor 106. In a particular implementation, the environmental state determination logic 134 may track the light level data over time and may generate the activation signal 144 in response to determining that the light level satisfies the light level threshold for a threshold period of time. The environmental state determination logic 134 may further transmit a deactivation signal to the depth sensor 106 in response to detecting that the light level data no longer satisfies the threshold (e.g., for a second threshold period of time).

As another example of activating the depth sensor 106, the environmental state determination logic 134 may determine to activate the depth sensor 106 based on sound data included in the first sensor data 142. The sound data may indicate a noise level of the volume. In response to the first sensor data 142 indicating a sound level that satisfies (e.g., exceeds) a sound threshold, the environmental state determination logic 134 may send the activation signal 144 to the depth sensor 106. When a volume of the sounds is great, recorded sounds of the occupant 190 (e.g., breathing sounds) may be difficult to distinguish in the first sensor data 142. By activating the depth sensor 106, the environmental state determination logic 134 may obtain additional sensor data (e.g., depth data) for the occupant state determination logic 132 to use to classify the state of the occupant 190.

As another example of activating the depth sensor 106, the environmental state determination logic 134 may determine to activate the depth sensor 106 based on temperature data included in the first sensor data 142. High or low temperatures may be associated with increased occupant distraction. The temperature data may indicate a temperature of the volume (or of the other environment of the occupant 190). In response to the first sensor data 142 indicating a temperature that satisfies (e.g., exceeds or is less than) a temperature threshold, the environmental state determination logic 134 may send the activation signal 144 to the depth sensor 106.

In response to the activation signal 144, the depth sensor 106 may activate and generate depth data 146. To illustrate, the depth sensor 106 may project a laser to a volume associated with at least a portion of the occupant 190. The volume may correspond to a space the occupant 190 is likely to be in. For example, the volume may correspond to a driver's seat of a car. The depth sensor 106 may project the laser toward a head of the occupant 190 to determine a distance (e.g., the depth data 146) from the depth sensor 106 to a portion (e.g., a face) of the occupant 190. In some implementations, the depth sensor 106, prior to projection of the laser, may identify the face of the occupant 190 (e.g., based on the first sensor data 142 or based on other image data). The depth sensor 106 may adjust a laser projector of the depth sensor (e.g., via one or more servos, actuators, motors, etc.) to project the laser onto a portion of the face of the occupant 190 away from eyes of the occupant 190. The depth sensor 106 may transmit the depth data 146 to the processor 102. In some examples, the processor 102 may store the depth data 146 in the memory 112. To illustrate, FIG. 1 shows the memory 112 storing the depth data 146.

The occupant state determination logic 132 may use the depth data 146 (or both the depth data 146 and the first sensor data 142) to determine (e.g., verify) the state of the occupant 190. For example, the occupant state determination logic 132 (or the environmental state determination logic 134) may activate the depth sensor 106 based on the first sensor data 142 indicating one or more defined states (e.g., for a period of time that satisfies a first threshold). The one or more defined states may be associated with at least a portion of the occupant 190 or with an environment of the occupant 190 (e.g., detection of the state of the occupant 190 may be difficult due to environmental conditions). Data corresponding to the one or more defined states may be stored in the memory 112. Using the depth data 146 and the first sensor data 142, the occupant state determination logic 132 may identify the state of the occupant 190 to verify whether the state corresponds to a particular state of the one or more defined states (e.g., for a period of time that satisfies a second threshold). In response to determining that the state of the occupant 190 corresponds to the one or more defined states, the occupant state determination logic 132 may initiate a remedial action, as described further below.

In alternative examples, the occupant state determination logic 132 may use the depth data 146 from the depth sensor 106 and second sensor data (not shown) received from the first sensor 104 to determine (e.g., verify) the state of the occupant 190. The first sensor data 142 and the second sensor data may be generated at different times (e.g., the second data may be generated after the first sensor data 142).

In a particular example, the occupant state determination logic 132 may estimate a head pose of the occupant 190, features of a face of the occupant 190, or a combination thereof, based on the depth data 146. The occupant state determination logic 132 may combine two dimensional image data from the first sensor data 142 (or the second sensor data) with the depth data 146 to generate three dimensional data. For example, combining the two dimensional data and the depth data 146 may include generating a three dimensional head pose of the occupant 190 based on the two dimensional image data and the depth data 146.

Based on the head pose, the features of the face, or a combination thereof, the occupant state determination logic 132 may identify the state of the occupant 190. To illustrate, if the head pose indicates the occupant 190 is focused away from a direction of operation of the vehicle 101, the occupant state determination logic 132 may determine that the state of the occupant 190 corresponds to one or more defined states (e.g., a sleeping state or a distracted state). The occupant state determination logic 132 may determine the state of the occupant 190 corresponds to the one or more defined states in response to detecting that the head pose corresponds to the one or more defined states for a duration of time that satisfies a threshold.

Responsive to the occupant state determination logic 132 determining (e.g., based on depth data 146) that the state of the occupant 190 corresponds to one or more defined states, the response determination logic 138 may initiate the remedial action. In particular examples, generating the remedial action may include generating an alert to be output by an output device (e.g., the display device 108, the audio device 110, a haptic feedback system, another output device, or a combination thereof). To illustrate, the response determination logic 138 may generate a visual alert 152 to be displayed on the display device 108. The display device 108 may display the visual alert 152. The visual alert 152 may correspond to a graphic, a video, text, or a combination thereof. In addition or in the alternative, the response determination logic 138 may transmit an audio alert 154 to be output by the audio device 110. The audio alert 154 may correspond to a warning sound (e.g., a beep or an air horn) or to a spoken warning (e.g., "Please pay attention to the road.").

In addition or in the alternative, the response determination logic 138 may send one or more control signals 156 to the vehicle systems controller 114. In response to the one or more control signals 156, the vehicle systems controller 114 may activate, deactivate, or operate one or more systems of the vehicle. To illustrate, the vehicle systems controller 114 may adjust a temperature setting associated with a heating/cooling unit of the vehicle 101. Adjusting the temperature setting may reduce drowsiness of the occupant 190. For example, in response to detecting that a state of the occupant 190 corresponds to a drowsy state, the response determination logic 138 may generate a control signal configured to cause the vehicle systems controller 114 to decrease a temperature of the volume. In another illustrative example, the vehicle systems controller 114 may activate a self-driving mode of the vehicle 101 in response to the one or more control signals 156. As a further example, the vehicle systems controller 114 may deactivate an engine of the vehicle 101, activate a brake of the vehicle 101, or a combination thereof. As an additional example, the vehicle systems controller 114 may activate a haptic feedback system (e.g., a vibrating seat system). As a further example, the vehicle systems controller 114 may activate, deactivate, or adjust settings of an audio or visual system (e.g., an entertainment system) of the vehicle 101.

Data corresponding to (e.g., identifying or logging) the remedial action may be stored in the memory 112. In particular examples, the occupant state determination logic 132 may continue monitoring the state of the occupant 190 after the remedial action is initiated. The occupant state determination logic 132 may store history data in the memory 112. The history data may indicate how particular remedial actions affect the state of the occupant 190. In particular examples, the response determination logic 138 may select remedial actions based on the history data stored in the memory 112. To illustrate, the occupant state determination logic 132 may detect that after decreasing a temperature in the vehicle 101, the occupant 190 becomes more drowsy (or remains in a drowsy state) rather than less drowsy. The occupant state determination logic 132 may store history data indicating that decreasing the temperature causes occupants (or the occupant 190 in particular) to become more drowsy. Based on the history data, the response determination logic 138 may increase the temperature in response to the occupant state determination logic 132 detecting that the state of the occupant 190 is drowsy. As another example, the occupant state determination logic 132 may detect that after increasing a sound level of an entertainment system of the vehicle 101 to a first sound level, the occupant 190 remains drowsy. The occupant state determination logic 132 may store history data indicating that the first sound level does not cause the occupant 190 to become more alert. Based on the history data, the response determination logic 138 may increase the sound level of the entertainment system to a second sound level greater than the first sound level in response to the occupant state determination logic 132 detecting that the state of the occupant 190 is drowsy. Thus, the occupant state determination logic 132 may select remedial actions based on observed effects of past remedial actions.

In some examples, the response determination logic 138 may send one or more signals via the communication device 116. To illustrate, responsive to the occupant state determination logic 132 determining (e.g., based on depth data 146) that the state of the occupant 190 corresponds to one or more defined states, the response determination logic 138 may initiate transmission of a message, an alert, a warning, or a combination thereof to a remote device via the communication device 116. The remote device may be associated with an emergency services agency, a law enforcement agency, or an insurance agency (e.g., an insurer associated with the occupant 190 or with the vehicle 101). To illustrate, the response determination logic 138 may initiate a phone call to the emergency services agency.

In some implementations, in response to the response determination logic 138 initiating the remedial action, the response determination logic 138 may send a deactivation signal (not shown) to the depth sensor 106. In response to the deactivation signal, the depth sensor 106 may deactivate. In another example, the occupant state determination logic 132 may send the deactivation signal to the depth sensor 106 in response to determining that the state of the occupant 190 no longer (e.g., for a threshold time period) corresponds to one or more defined states. In another example, the environmental state determination logic 134 may send the deactivation signal to the depth sensor 106 in response to determining that the state of the environment associated with the occupant 190 no longer (e.g., for a threshold time period) corresponds to one or more defined states. In another example, the processor 102 may generate the deactivation signal in response to a period of time passing since generation of the activation signal 144.

Thus, the depth sensor 106 may be selectively activated and deactivated. Accordingly, a laser of the depth sensor 106 may be directed at the occupant 190 for a shorter period of time as compared to systems which utilize a constantly activated depth sensor. Reducing a period of exposure to the laser may be beneficial to the occupant 190. Further, selectively activating the depth sensor 106 may consume less power than in systems in which activation of a depth sensor is tied to activation of a driver assistance system. Consuming less power may improve fuel economy, battery life, or a combination thereof, of vehicles that include the system 100. Further, classifying the state of the occupant 190 using the first sensor data 142 may be faster or less complex than classification of the state of the occupant 190 using the depth data 146. Accordingly, the system 100 may enable faster or more efficient classification of an operator in instances when the state of the operator does not correspond to any of one or more defined states.

Figure 2:
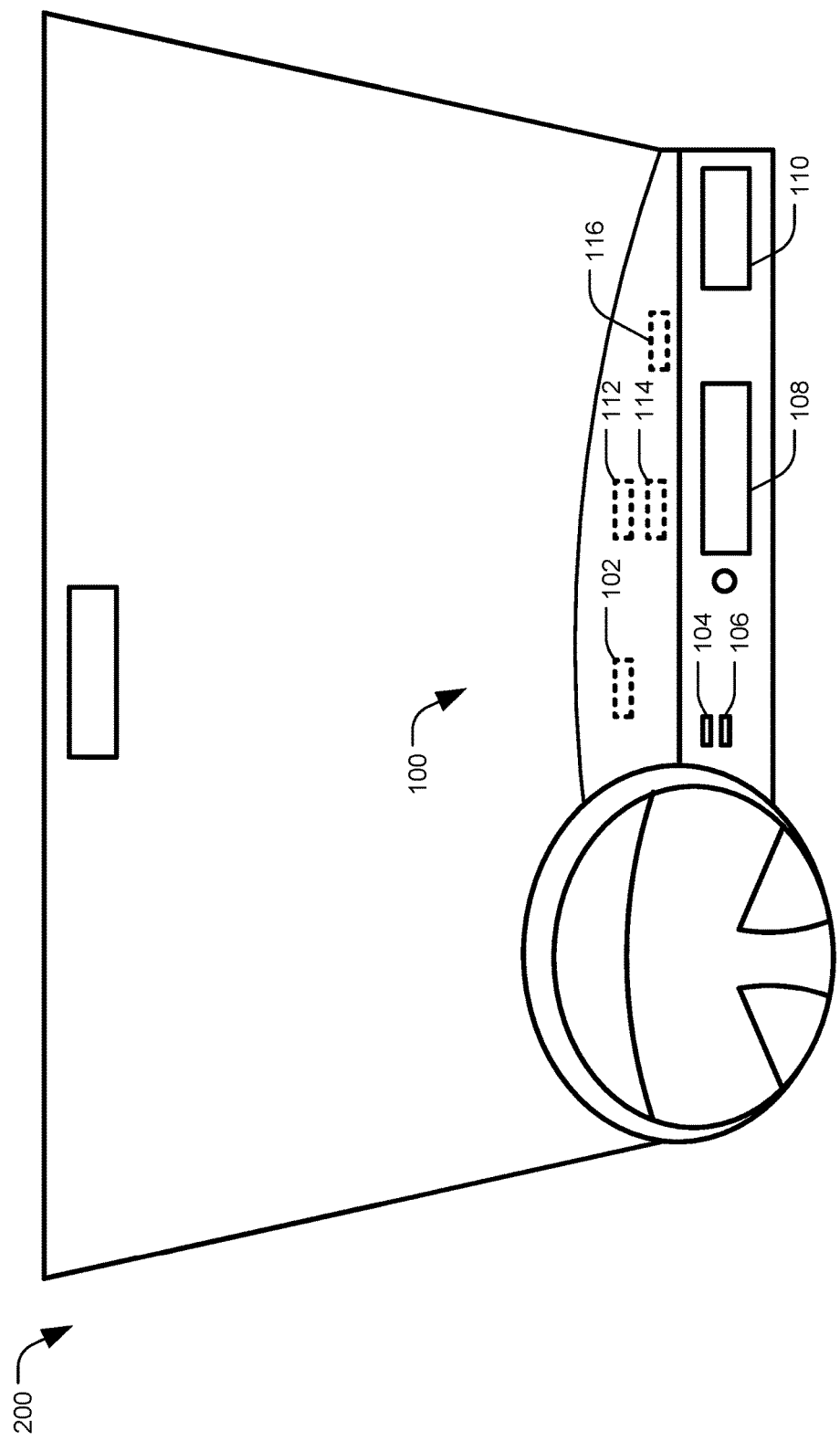
FIG. 2 is an illustrative layout of the system for activating a sensor.

Referring to FIG. 2, a representational layout 200 of the system 100 is illustrated. As illustrated, the first sensor 104, the depth sensor 106, the display device 108, and the audio device 110 may be arranged on a dashboard of a vehicle. The processor 102, the memory 112, the communication device 116, and the vehicle systems controller 114 may be housed within the dashboard. The layout 200 of FIG. 2 is for illustrative purposes only. The system 100 may be arranged in other layouts. For example, the first sensor 104, the depth sensor 106, or a combination thereof may be located in a rear view mirror apparatus of the vehicle 101.

Figure 3:
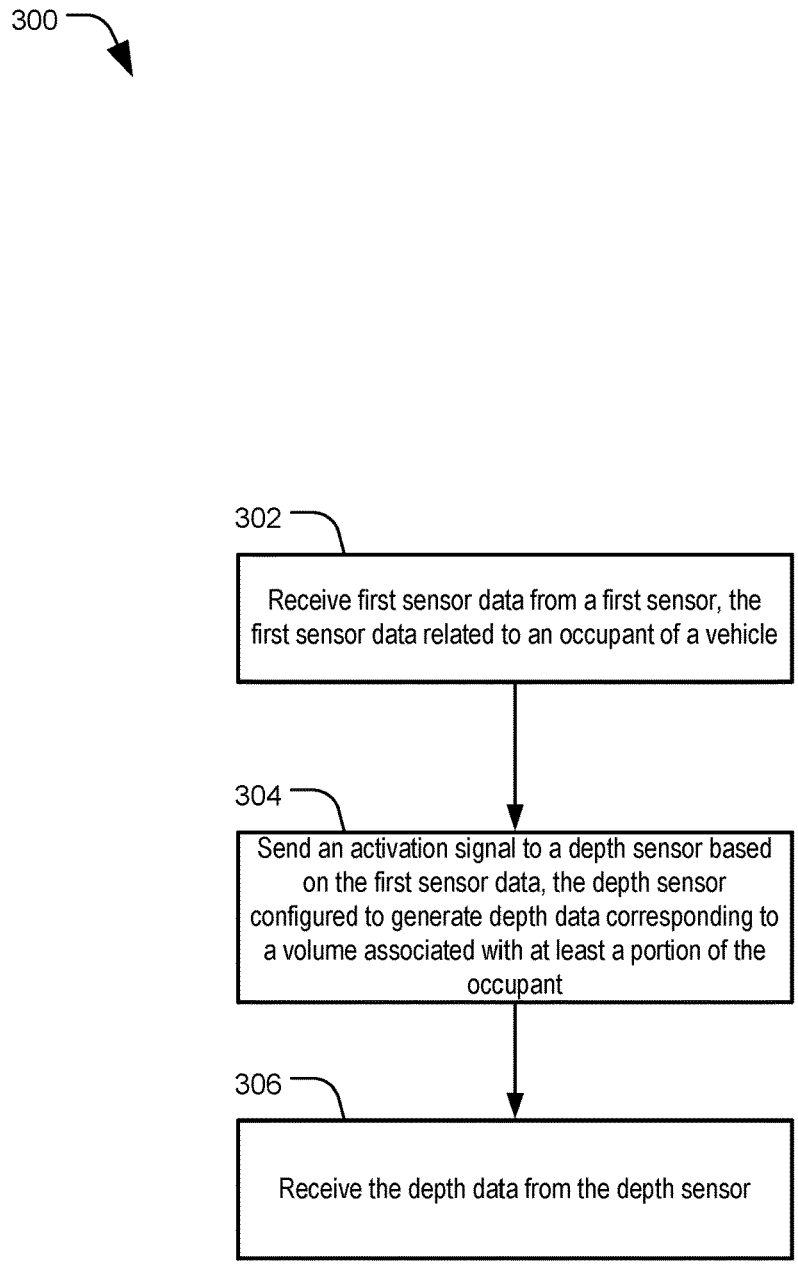
FIG. 3 is a flowchart illustrating a method of activating a sensor.

Referring to FIG. 3, an illustrative method 300 of activating a sensor is shown. The method 300 may be performed by the processor 102 of FIG. 1.

The method 300 includes receiving first sensor data from a first sensor, at 302. The first sensor data is related to an occupant of a vehicle. For example, the processor 102 may receive the first sensor data 142 from the first sensor 104. The first sensor data 142 may be related to the occupant 190. The first sensor data may include a two dimensional image of an occupant of the vehicle, an audio sample taken within the vehicle where the occupant is located, an indication of a light level inside the vehicle, one or more other types of sensor data, or a combination thereof.

The method 300 further includes sending an activation signal to a depth sensor based on the first sensor data, at 304. The depth sensor may correspond to the depth sensor 106 of FIG. 1. The depth sensor may be configured to generate depth data, such as the depth data 146, corresponding to a volume associated with at least a portion of the occupant (e.g., a three dimensional space inside the vehicle). For example, the processor 102 may be configured to activate the depth sensor 106 based on the first sensor data 142. The depth sensor 106 may be configured to generate depth data corresponding to a seat of the occupant 190 of the vehicle 101. In a particular example, the occupant state determination logic 132 may determine to send the activation signal 144 to the depth sensor 106 in response to determining that the first sensor data 142 indicates that the state of the occupant 190 corresponds to one or more defined states. The occupant state determination logic 132 may estimate a head pose of the occupant 190 based on two dimensional image data included in the first sensor data 142. The occupant state determination logic 132 may determine whether to classify the state of the occupant 190 as dangerous based on the head pose. For example, the occupant state determination logic 132 may send the activation signal 144 to the depth sensor 106 in response to determining that the head pose indicates the occupant 190 is not facing a road on which the vehicle 101 is traveling. As another example, the environmental state determination logic 134 may send the activation signal 144 to the depth sensor 106 in response to determining that the first sensor data 142 indicates that an environmental state (e.g., a light level or a sound level) satisfies a threshold.

The method 300 further includes receiving depth data from the depth sensor, at 306. For example, the processor 102 may receive the depth data 146.

In a particular example, the method 300 further includes, in response to determining to activate the depth sensor, determining a classification of a state of the driver based on the depth data and the first sensor data. For example, the occupant state determination logic 132 may determine whether to classify the state of the occupant 190 as corresponding to one or more defined states based on the first sensor data 142 and the depth data 146. To illustrate, the occupant state determination logic 132 may combine the depth data 146 with two dimensional image data from the first sensor data 142 to estimate a head pose of the occupant 190. Based on the head pose, the occupant state determination logic 132 may classify the state of the occupant 190. For example, the occupant state determination logic 132 may classify the state of the occupant 190 as corresponding to one or more defined states in response to the head pose indicating that the occupant 190 is not facing a road on which the vehicle 101 is traveling.

In a particular example, the method 300 further includes, in response to determining to classify the state of the occupant as corresponding to one or more defined states, outputting an audio alert via a speaker, outputting a visual alert via a display, activating an automated driving system, deactivating an engine, deactivating the vehicle, or a combination thereof. To illustrate, the occupant state determination logic 132 may initiate a remedial action in response to determining to classify the state of the occupant 190 as corresponding to one or more defined states. The remedial action may include outputting the visual alert 152, the audio alert 154, the one or more control signals 156, or a combination thereof. The visual alert 152 may be displayed via the display device 108. The audio alert 154 may be output via the audio device 110. In response to the one or more control signals 156, the vehicle systems controller 114 may activate an automated driving system, deactivate an engine of the vehicle 101, deactivating the vehicle 101, or a combination thereof. The remedial action may be initiated by the occupant state determination logic 132 in response to the occupant state determination logic 132 determining that the state of the occupant 190 corresponds to the one or more defined states for a period of time that satisfies a threshold.

The method 300 may enable selective activation of a depth sensor. Accordingly, the method 300 may enable reduced exposure of an occupant to a laser associated with the depth sensor. Further, the method 300 may increase driver safety by activating the depth sensor when higher accuracy is beneficial to determine (e.g., confirm) the state of the driver. Further the method 300 may reduce power consumption associated with the depth sensor.

Figure 4:
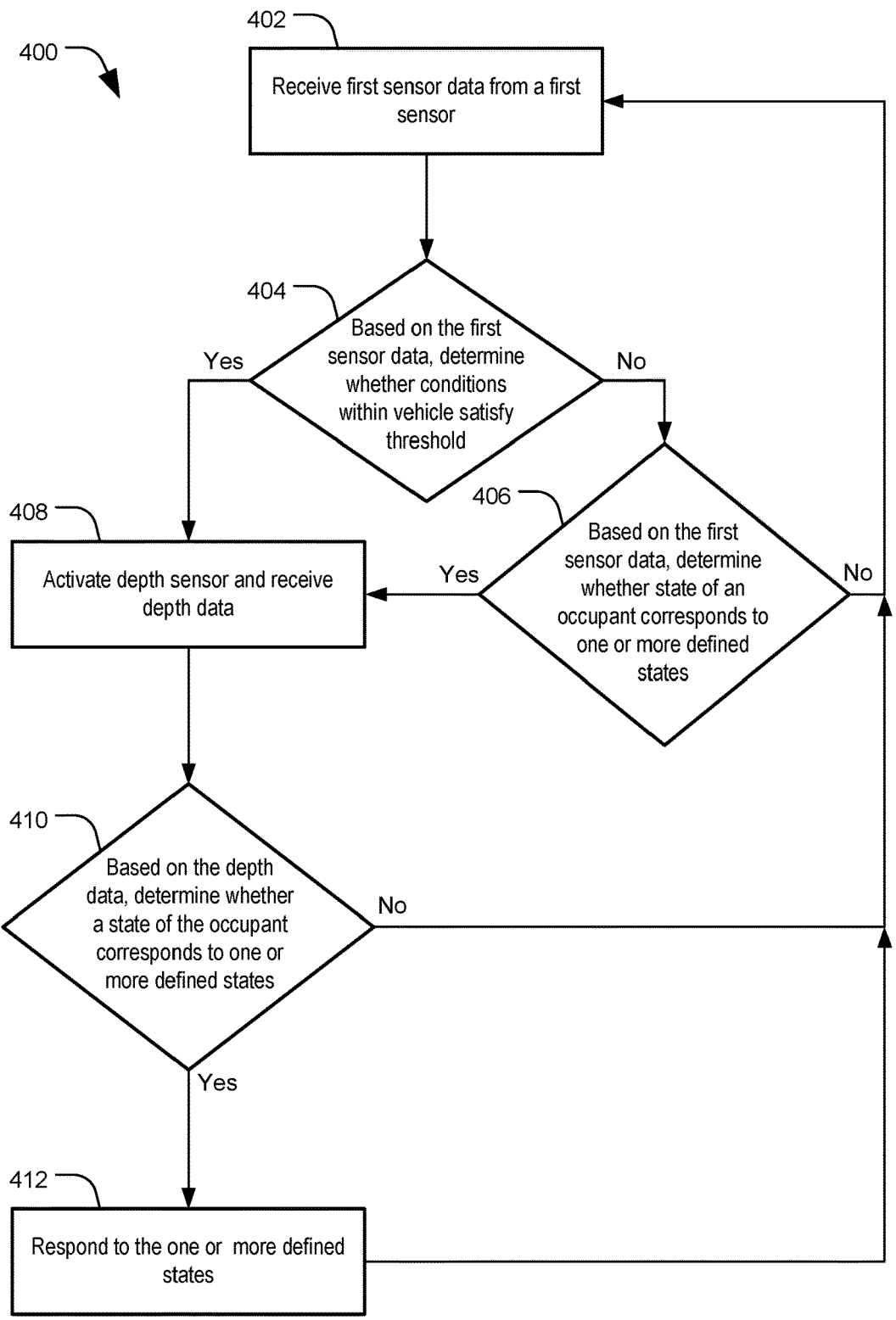
FIG. 4 is a flowchart illustrating another method of activating a sensor.

Referring to FIG. 4, another method 400 of activating a sensor is shown. The method 400 may be performed by the processor 102 of FIG. 1.

The method 400 includes receiving first sensor data from a first sensor, at 402. For example, the processor 102 may receive the first sensor data 142 from the first sensor 104.

The method 400 further includes, based on the first sensor data, determining whether conditions within a vehicle satisfy a threshold, at 404. For example, the environmental state determination logic 134 may determine whether the first sensor data indicates that an environmental state (e.g., a light or a sound level) associated with an operator volume of the vehicle 101 satisfies (e.g., exceeds) a threshold such that determination of the occupant state may benefit from use of a depth sensor. In response to the environmental condition satisfying the threshold, the method 400 includes activating a depth sensor and receiving depth data, at 408. For example, the environmental state determination logic 134 may send the activation signal 144 to the depth sensor 106 to activate the depth sensor 106. In response to the activation signal 144, the depth sensor 106 may generate depth data 146 and send the depth data 146 to the processor 102.

In response to the environmental condition not satisfying the threshold, at 404, the method 400 includes, based on the first sensor data, determining whether a state of an occupant corresponds to one or more defined states, at 406. For example, the occupant state determination logic 132 may determine whether the state of the occupant 190 corresponds to one or more defined states (e.g., a distracted state, an impaired state, a sleeping state, etc.).

In response to determining based on the first sensor data that the state of the occupant does not correspond to the one or more defined states, at 406, the method 400 includes receiving first sensor data from the first sensor, at 402. Otherwise, in response to determining based on the first sensor data that the state of the occupant corresponds to the one or more defined states, the method 400 includes activating the depth sensor and receiving the depth data, at 408. For example, the occupant state determination logic 132 may send the activation signal 144 to the depth sensor 106 in response to determining that the state of the occupant 190 corresponds to the one or more defined states. In response to the activation signal 144, the depth sensor 106 may send the depth data 146 to the processor 102.

The method 400 further includes, based on the depth data, determining whether the state of the occupant corresponds to the one or more defined states, at 410. For example, the occupant state determination logic 132 may determine a head pose of the occupant 190 based on the depth data 146 and based on the first sensor data 142. Based on the head pose, the occupant state determination logic 132 may determine whether (e.g., confirm or verify) the state of the occupant 190 corresponds to the one or more defined states.

In response to determining, based on the depth data, that the state of the occupant does not correspond to the one or more defined states, at 410, the method 400 may return to receiving the first sensor data from the first sensor, at 402. Otherwise, in response to determining, based on the depth data, that the state of the occupant corresponds to the one or more defined states, at 410, the method 400 includes responding to the one or more defined states, at 412. For example, the occupant state determination logic 132 may generate the visual alert 152, the audio alert 154, the one or more control signals 156, or a combination thereof, in response to determining based on the depth data 146 that the state of the occupant 190 corresponds to one or more defined states.

Thus, the method 400 may enable selective activation of a depth sensor. Selective activation of the depth sensor may enable operation of the depth sensor while decreasing a period of time that an occupant is exposed to the depth sensor. Selective activation of the depth sensor may further conserve power associated with use of depth sensor since the depth sensor may be turned off for periods of time.

Figure 5:
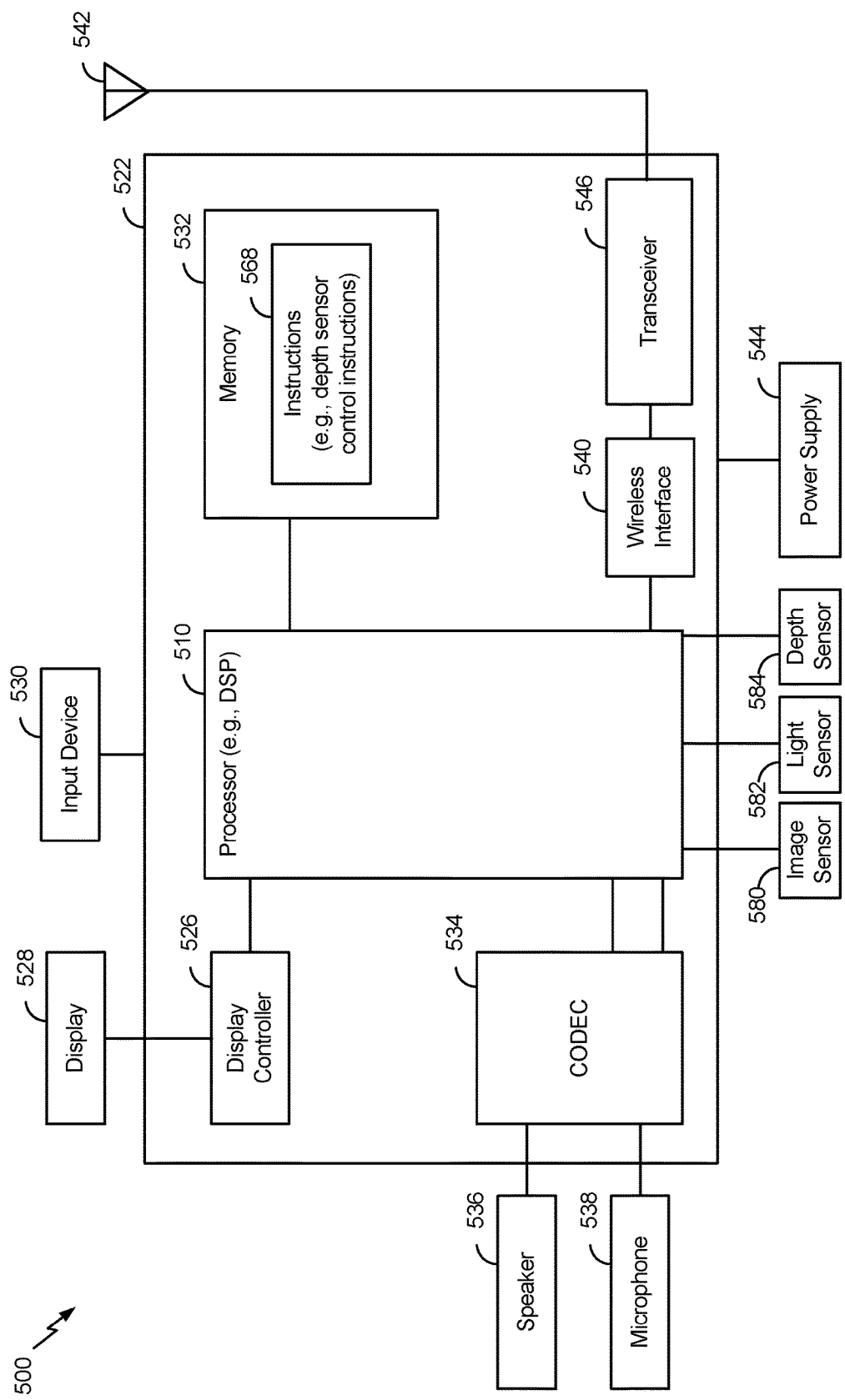
FIG. 5 is a block diagram of an illustrative device for activating a sensor.

Referring to FIG. 5, a block diagram of a particular illustrative implementation of a device (e.g., a wireless communication device) is depicted and generally designated 500. In various implementations, the device 500 may have more or fewer components than illustrated in FIG. 5.

In a particular implementation, the device 500 includes a processor 510, such as a central processing unit (CPU) or a digital signal processor (DSP), coupled to a memory 532. The memory 532 may include a computer-readable storage device (e.g., a computer-readable storage medium). For example, the memory 532 may be a non-transitory computer-readable storage medium. The memory 532 includes instructions 568 (e.g., depth sensor control instructions) such as computer-readable instructions or processor-readable instructions. The processor 510 may correspond to the processor 102 of FIG. 1. The memory 532 may correspond to the memory 112. The instructions 568 may be executable by the processor 510 to perform any of the methods or operations described herein with reference to FIGS. 1-4. The instructions 568 may include one or more additional instructions that are executable by a computer.

FIG. 5 also illustrates a display controller 526 that is coupled to the processor 510 and to a display 528. The display 528 may correspond to the display device 108 of FIG. 1. A coder/decoder (CODEC) 534 may also be coupled to the processor 510. A speaker 536 and a microphone 538 may be coupled to the CODEC 534. The speaker 536 may correspond to the audio device 110 of FIG. 1.

FIG. 5 also illustrates that a wireless interface 540, such as a wireless controller, and a transceiver 546 (e.g., a receiver and a transmitter) may be coupled to the processor 510 and to an antenna 542, such that wireless data received via the antenna 542, the transceiver 546, and the wireless interface 540 may be provided to the processor 510. The wireless interface 540, the transceiver 546, the antenna 542, or a combination thereof may correspond to the communication device 116.

FIG. 5 also illustrates an image sensor 580, a light sensor 582, and a depth sensor 584 coupled to the processor 510.

The image sensor 580, the light sensor 582, the microphone 538, or a combination thereof may correspond to the first sensor 104 of FIG. 1. The depth sensor 584 may correspond to the depth sensor 106 of FIG. 1.

In some implementations, the processor 510, the display controller 526, the memory 532, the CODEC 534, the wireless interface 540, and the transceiver 546 are included in a system-in-package or system-on-chip device 522. In some implementations, an input device 530 and a power supply 544 are coupled to the system-on-chip device 522. Moreover, in a particular implementation, as illustrated in FIG. 5, the display 528, the input device 530, the speaker 536, the microphone 538, the antenna 542, and the power supply 544 are external to the system-on-chip device 522. In a particular implementation, each of the display 528, the input device 530, the speaker 536, the microphone 538, the antenna 542, and the power supply 544 may be coupled to a component of the system-on-chip device 522, such as an interface or a controller.

The device 500 may include a vehicle, a drone, headset, a mobile communication device, a smart phone, a cellular phone, a laptop computer, a computer, a tablet, a personal digital assistant, a display device, a television, a gaming console, a music player, a radio, a digital video player, a digital video disc (DVD) player, a tuner, a camera, a navigation device, a vehicle, a component of a vehicle, or any combination thereof, as an illustrative, non-limiting example.

In an illustrative example, the processor 510 may be operable to perform all or a portion of the methods or operations described with reference to FIGS. 1-5. For example, the processor 510 may execute the instructions 568 to cause the processor 510 to receive first sensor data from a first sensor (e.g., the microphone 538, the image sensor 580, the light sensor 582, one or more other circuits to generate first sensor data, or a combination thereof), the first sensor related to an occupant of a vehicle. The processor 510 may also execute the instructions 568 to determine whether to activate a depth sensor (e.g., the depth sensor 584) based on the first sensor data. For example, the instructions 568 may correspond to the instructions 130, the occupant state determination logic 132, the environmental state determination logic 134, the response determination logic 138, or a combination thereof.

In conjunction with the described aspects, an apparatus includes means for generating first sensor data related to an occupant of a vehicle. For example, the means for generating first sensor data may include or correspond to the first sensor 104, the microphone 538, the image sensor 580, the light sensor 582, or a combination thereof.

The apparatus may also include means for generating depth data corresponding to a volume associated with at least a portion of the occupant. For example, the means for generating depth data may include or correspond to the depth sensor 106, the depth sensor 584, or a combination thereof.

The apparatus may further include means for activating the means for generating depth data based on the first sensor data. For example, the means for activating may include or correspond to the processor 102, the occupant state determination logic 132, the environmental state determination logic 134, the processor 102 programmed to execute the instructions 130 stored in the memory 112, the processor 510, the processor 510 programmed to execute the instructions 568 stored in the memory 532, one or more other structures, devices, circuits, modules, or instructions to activate means for generating depth data, or a combination thereof.

The apparatus may further include means for outputting an audio alert. The means for outputting the audio alert may be incorporated into a vehicle. For example, the means for outputting the audio alert may include or correspond to the audio device 110, the speaker 536, or a combination thereof.

The apparatus may further include means for outputting a visual alert. The means for outputting the visual alert may be incorporated into a vehicle. For example, the means for outputting the visual alert may include or correspond to the display device 108, the display 528, or a combination thereof.

In some implementations, the means for generating first sensor data, the means for generating depth data, the means for activating, the means for outputting the audio alert, and the means for outputting the video alert are integrated into a mobile phone, a cellular phone, a computer, a portable computer, a tuner, a radio, a satellite radio, a communication device, a modem, a portable music player, a portable digital video player, a navigation device, a personal digital assistant (PDA), a mobile location data unit, or a combination thereof.

One or more of the disclosed aspects may be implemented in a system or an apparatus, such as the device 500, that may include a communications device, a fixed location data unit, a mobile location data unit, a mobile phone, a cellular phone, a satellite phone, a computer, a tablet, a portable computer, a display device, a media player, or a desktop computer. Alternatively or additionally, the device 500 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle, a component integrated within a vehicle, any other device that includes a processor or that stores or retrieves data or computer instructions, or a combination thereof. As another illustrative, non-limiting example, the system or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

In the aspects of the description described above, various functions performed have been described as being performed by certain circuitry or components, such as circuitry or components of the system 100 of FIG. 1, the device 500 of FIG. 5, or a combination thereof. However, this division of circuitry and components is for illustration only. In alternative examples, a function performed by a particular circuit or component may instead be divided amongst multiple circuits or components. Moreover, in other alternative examples, two or more circuits or components of FIGS. 1 and 5 may be integrated into a single circuit or component. Each circuit and component illustrated in FIGS. 1 and 5 may be implemented using hardware (e.g., an ASIC, a DSP, a controller, a FPGA device, etc.), software (e.g., logic, modules, instructions executable by a processor, etc.), or any combination thereof.

Although one or more of FIGS. 1-5 may illustrate systems, apparatuses, or methods according to the teachings of the disclosure, the disclosure is not limited to these illustrated systems, apparatuses, or methods. One or more functions or components of any of FIGS. 1-5 as illustrated or described herein may be combined with one or more other portions of another of FIGS. 1-5. For example, one or more elements of the method 300 of FIG. 3 may be performed in combination with the method 400 of FIG. 4. Accordingly, no single implementation described herein should be construed as limiting and implementations of the disclosure may be suitably combined without departing form the teachings of the disclosure. As an example, one or more operations described with reference to FIGS. 4 and 5 may be optional, may be performed at least partially concurrently, or may be performed in a different order than shown or described.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. An apparatus comprising:
 a first sensor configured to generate sensor data related to an occupant of a vehicle;
 a depth sensor configured to generate depth data corresponding to a volume associated with at least a portion of the occupant; and
 a processor configured to:
  receive the sensor data;
  activate the depth sensor, conditioned on identifying a state of the occupant based on the sensor data, to generate the depth data; and
  initiate a remedial action conditioned on verifying the identified state.

2. The apparatus of claim 1, wherein the processor is configured to reduce exposure of the occupant to output from the depth sensor as compared to a device in which an active depth sensor is constantly activated.

3. The apparatus of claim 1, wherein the first sensor comprises an image sensor.

4. The apparatus of claim 1, wherein the first sensor includes an audio sensor.

5. The apparatus of claim 1, wherein the remedial action includes an alert responsive to a determination, based on the sensor data and the depth data, that the state corresponds to one or more defined states.

6. The apparatus of claim 5, wherein the depth sensor includes a laser device, and wherein the alert is provided via a display device or an audio device.

7. The apparatus of claim 1, wherein the depth sensor is configured to:
 receive an activation signal from the processor, the activation signal configured to activate the depth sensor to project energy and generate the depth data; and
 upon activation of the depth sensor, target a seat of the vehicle or a head of the occupant with the energy.

8. The apparatus of claim 5, wherein the alert is provided via haptic feedback.

9. The apparatus of claim 1, wherein the sensor data comprises image data corresponding to an image of the occupant, and wherein the processor is configured to classify the state by determining, based on the image data, a head pose of the occupant, features of a face of the occupant, or a combination thereof.

10. The apparatus of claim 1, wherein the sensor data comprises light level data, and wherein the processor is configured to activate the depth sensor in response to the light level data satisfying a threshold.

11. The apparatus of claim 1, wherein the first sensor, the depth sensor, and the processor are integrated into the vehicle.

12. A method of activating an active depth sensor, the method comprising:
 receiving, at a processor, sensor data from a first sensor, the sensor data related to an occupant of a vehicle;
 conditioned on detecting a compromised or hazardous state of the occupant based on the sensor data, sending an activation signal from the processor to the active depth sensor to cause the active depth sensor to generate depth data; and
 receiving, at the processor, the depth data from the active depth sensor, the depth data corresponding to a volume associated with at least a portion of the occupant.

13. The method of claim 12, wherein the processor is configured to reduce exposure of the occupant to output from the active depth sensor as compared to a device in which a depth sensor is constantly activated, and further comprising determining, at the processor, a classification of the state based on the depth data and the sensor data.

14. The method of claim 12, further comprising, in response to determining that the state corresponds to one or more defined states, outputting an audio alert via a speaker, outputting a visual alert via a display, activating an automated driving system, deactivating an engine, deactivating the vehicle, or a combination thereof.

15. The method of claim 12, further comprising:
determining, at the processor, whether the state corresponds to one or more defined states based on the sensor data; and
determining, at the processor, to activate the active depth sensor in response to determining that the state corresponds to the one or more defined states for a period of time that satisfies a threshold.

16. The method of claim 15, wherein the one or more defined states are associated with distraction of the occupant, sleeping of the occupant, impairment of the occupant, or a combination thereof.

17. The method of claim 15, wherein the sensor data comprises image data corresponding to an image of the occupant, and wherein determining the state includes determining a head pose of the occupant based on the image data.

18. The method of claim 12, further comprising:
determining, based on the sensor data, whether a light level associated with the volume satisfies a threshold; and
determining to activate the active depth sensor in response to the light level satisfying the threshold.

19. A computer-readable storage device storing instructions that, when executed by a processor, cause the processor to:
receive sensor data from a first sensor, the sensor data related to an occupant of a vehicle;
activate a depth sensor, conditioned on identifying a state of the occupant based on the sensor data, to generate depth data; and
receive the depth data from the depth sensor, the depth data corresponding to a volume associated with at least a portion of the occupant.

20. The computer-readable storage device of claim 19, wherein:
the instructions are configured to reduce exposure of the occupant to output from the depth sensor as compared to an active depth sensor that is constantly activated, and
the instructions, when executed by the processor, further cause the processor to determine whether to classify the state as one or more defined states based on the depth data and the sensor data.

21. The computer-readable storage device of claim 20, wherein determining whether to classify the state as the one or more defined states includes combining two dimensional image data from the sensor data with the depth data to determine three dimensional data corresponding to the occupant.

22. The computer-readable storage device of claim 21, wherein combining the two dimensional image data with the depth data includes generating a three dimensional head pose of the occupant based on the two dimensional image data and the depth data.

23. The computer-readable storage device of claim 22, wherein the instructions, when executed by the processor, further cause the processor to classify the state as the one or more defined states in response to detecting that the three dimensional head pose indicates the one or more defined states for a duration of time that satisfies a threshold.

24. The computer-readable storage device of claim 23, wherein the instructions, when executed by the processor, further cause the processor to detect that the three dimensional head pose indicates the one or more defined states in response to the three dimensional head pose indicating that the occupant is focused away from a direction of operation of the vehicle.

25. The computer-readable storage device of claim 20, wherein the instructions, when executed by the processor, further cause the processor to:
identify passing of a period of time since activation of the depth sensor; and
deactivate the depth sensor in response to the period of time satisfying a threshold.

26. The computer-readable storage device of claim 20, wherein the instructions, when executed by the processor, further cause the processor to, in response to determining to classify the state as the one or more defined states, initiate a remedial action, the remedial action including outputting an audio alert via a speaker, outputting a visual alert via a display, activating an automated driving system, deactivating an engine, outputting a haptic alert, adjusting a setting of an audio or visual system of the vehicle, or a combination thereof.

27. The computer-readable storage device of claim 26, wherein the instructions, when executed by the processor, further cause the processor to deactivate the depth sensor in response to initiation of the remedial action.

28. The computer-readable storage device of claim 20, wherein the instructions, when executed by the processor, further cause the processor to, in response to determining to classify the state as the one or more defined states, initiate transmission of a message to a remote device.

29. An apparatus comprising:
means for generating sensor data related to an occupant of a vehicle;
means for generating depth data corresponding to a volume associated with at least a portion the occupant; and
means for activating the means for generating depth data, conditioned on identifying a state of the occupant based on the sensor data, to cause the means for generating to generate the depth data to enable determination of the detected state.

30. The apparatus of claim 29, further comprising means for outputting, based on the identified state, one or both of an audio alert and a visual alert, wherein:
the means for outputting is incorporated into the vehicle, and
the means for activating is configured to reduce exposure of the occupant to output from the means for generating as compared to a device in which a depth sensor is constantly activated.

* * * * *